March 23, 1948. C. E. BURTON 2,438,313
SAFETY LOCKING DEVICE FOR SUCKER ROD COUPLINGS
Filed Feb. 17, 1945 2 Sheets-Sheet 2
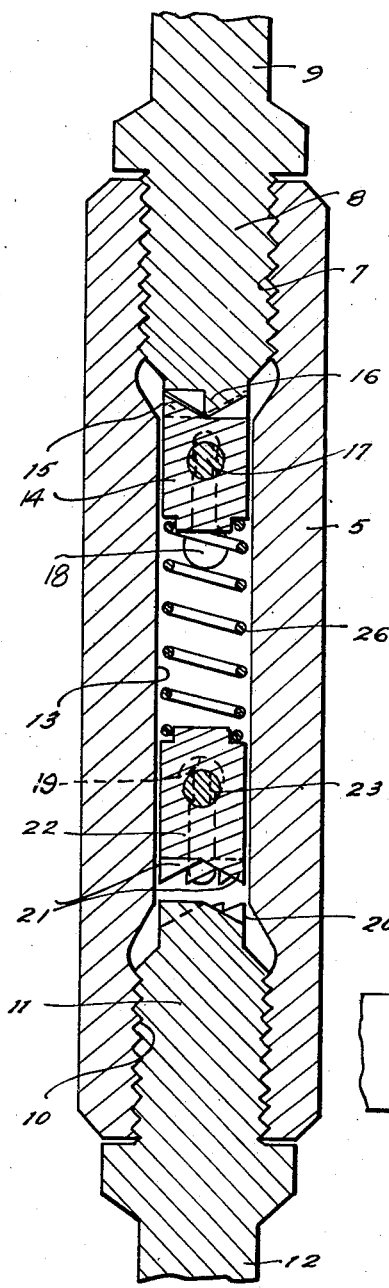
Fig. 3.
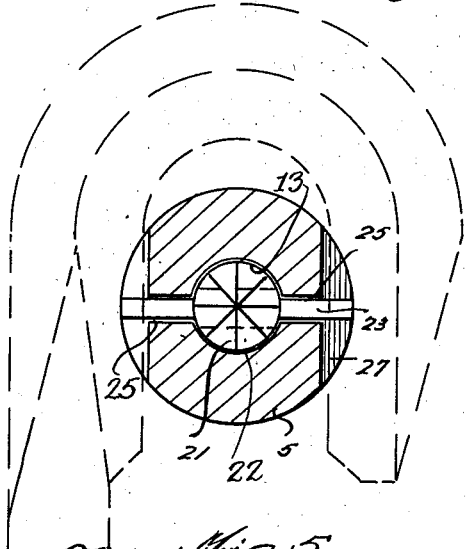
Fig. 4.
Fig. 5.
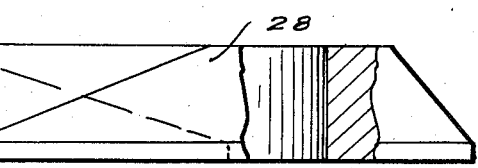
Fig. 6.
Inventor
Clyde E. Burton,
By *Clarence A. O'Brien and Harvey B. Jacobson*
Attorneys Patented Mar. 23, 1948

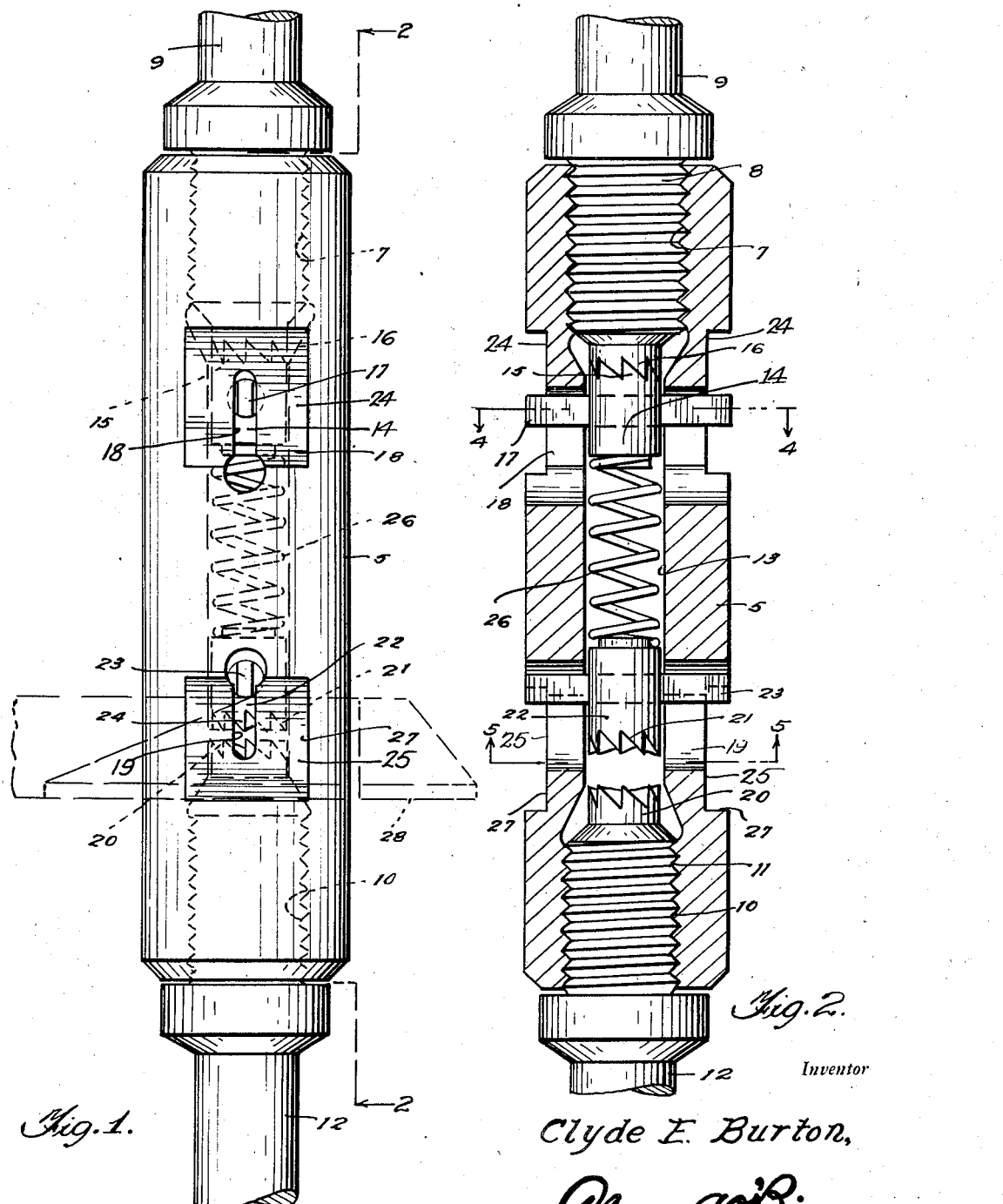

2,438,313

UNITED STATES PATENT OFFICE 2,438,313

SAFETY LOCKING DEVICE FOR SUCKER ROD COUPLINGS

Clyde E. Burton, Overton, Tex.

Application February 17, 1945, Serial No. 578,421

1 Claim. (Cl. 287—117)

This invention relates to improvements in sucker rod couplings, and one of the objects of the invention is the provision of a sucker rod coupling with means for preventing the connected sections of the sucker rod from unscrewing on the coupling, to preclude the possibilities of the lower sections and any tool or equipment carried thereby from being lost in the well, thus obviating an expensive and difficult problem of recovery, and consequent delay in production operations.

A further object of the invention is the provision of a safety locking device for sucker rod couplings, which will allow each rod section to be screwed into the coupling but will automatically prevent the accidental unscrewing of either rod section, while permitting manual unscrewing by a simple releasing operation.

A still further object of the invention is to provide a locking device for these general purposes, which can be easily assembled, which will continue to give dependable service and which can be manufactured at a low cost.

With the above and other objects in view the invention consists in certain new and useful constructions, combinations, and arrangements of parts, clearly described in the following specification, and fully illustrated in the accompanying drawings, in which:

Fig. 1 is a side elevation of the safety locking device and sucker rod coupling.

Fig. 2 is a longitudinal sectional view, taken on line 2—2 of Fig. 1, looking in the direction of the arrows.

Fig. 3 is another longitudinal sectional view, taken at right angles to Fig. 2.

Fig. 4 is a transverse sectional view, taken on line 4—4 of Fig. 2, looking in the direction of the arrows.

Fig. 5 is a similar view, taken on line 5—5 of Fig. 2, looking in the direction of the arrows.

Fig. 6 is a detail side view, partly in section, of a wrench designed for use in connecting and disconnecting the coupling device with the sucker rod sections.

Referring to the accompanying drawings, which show the practical application of my invention, 5 designates a coupling sleeve, which is internally threaded. At one end of the frame is a socket 7 for the reception of the externally threaded end 8 of a sucker rod section 9. The opposite end of said sleeve is internally threaded to form a socket 10 to receive the externally threaded end 11 of a sucker rod section 12. Formed adjacent opposite ends of the sleeve 5 are diametrically opposed flats 24 and 25 which cooperate to form wrench supporting surfaces as will be more fully hereinafter explained.

Extending longitudinally through the sleeve 5 is an axial bore 13, which opens at opposite ends into the threaded sockets 7 and 10 and extending transversely through the sleeve adjacent opposite ends of the bore 13 are keyhole slots 18 and 19, the enlarged ends of which are disposed inwardly with relation to the ends of the sleeve. Arranged to slide in the bore 13 near the internally threaded socket is a locking plug 14, the outer end of which is formed with ratchet teeth 15, which are adapted to interlock with matching ratchet teeth 16, formed on the threaded end 8 of the sucker rod section 9. Formed in the locking plug 14 is a transverse bore for the reception of cross pin 17, which when the device is assembled extends through the keyhole slot 18. The reduced end of this keyhole slot is long enough to allow the plug to slide a distance in the sleeve sufficient to permit the teeth 15 of said plug to fully interlock with the teeth 16 of the coupling rod section 9, and to fully release from such interlocked position therewith. The outer ends of the cross pin are flattened or reduced, so that the pin will have a parallel sliding action in the reduced portions of the slot 18 and will be held against rotation except when it aligns with the enlarged portion of the keyhole slot.

Disposed in the bore 13 of the sleeve adjacent the socket 10 is a longitudinally slidable plug 22 carrying at its end adjacent the socket 10, ratchet teeth 21 which are adapted to mesh with ratchet teeth 20 formed on the end of the center rod section 12. The plug 22 is formed with a transverse bore for the reception of a cross pin 23, the outer ends of which are flattened to slide in the keyhole slot 19.

A coil spring 26 is disposed in the bore 13 and bears at one end against the plug 14 and at its opposite end against the plug 22. This spring exerts sufficient pressure upon both ratchet teeth to normally hold the plugs interlocked with the ratchet teeth of the adjacent sucker rod sections 9 and 12.

The ratchet teeth are designed so that the sucker rod sections may be threaded into the coupling sleeve, against the locking plugs and the spring, the locking plugs yielding to allow this coupling of the sucker rod sections. But any tendency of the sucker rod sections to unscrew will be resisted and checked by the ratchet teeth. The cross pins of both locking plugs extend outwardly beyond the flats at their respective ends of the sleeve, so that they may be engaged by the hooked end of a wrench 28, opposite jaws of which are inclined to engage opposite ends of the adjacent cross pin and shift its respective plug endwise to disengage the teeth thereof from the ratchet teeth of an adjacent sucker rod. The plugs are prevented from turning in the sleeve, by the cross pins. In Fig. 2 one of the plugs is shown in locked position and one in released position.

It is obvious that so long as the plugs are interlocked with the coupled ends of the sucker rod sections, these sections cannot be accidentally uncoupled. It is, therefore, seen that my invention provides a safety locking coupling for sucker rods, which will reduce losses which result from delays incident to the loss of equipment carried by sucker rods which have become disconnected from their supporting rod sections, and increase the annual production by avoiding such losses.

It is understood that various changes in the details of construction, their combination and arrangement, may be made, within the scope of the invention, as defined by the claim hereof.

Having described my invention I claim as new:

A safety coupling for sucker rods each having an externally threaded boss at its end and ratchet teeth on the free end of the boss comprising a sleeve having an internally threaded socket at each end, and a transverse keyhole slot adjacent each socket, a plug slidable in the sleeve near each socket, ratchet teeth on the outer end of each plug, a spring between the plugs arranged yieldingly to hold the plugs in their outermost positions and the teeth on the outer ends of the plugs for meshing engagement with the teeth on an adjacent sucker rod and a pin extending transversely through each plug and operable in an adjacent keyhole slot whereby the plugs will be held against turning movement in the sleeve.

CLYDE E. BURTON.

REFERENCES CITED

The following references are of record in the file of this patent:

UNITED STATES PATENTS

| Number | Name | Date |
|---|---|---|
| 804,185 | Davison | Nov. 7, 1905 |
| 1,210,669 | Mike et al. | Jan. 2, 1917 |
| 1,372,031 | McKissick | Mar. 22, 1921 |
| 1,626,307 | Sullins et al. | Apr. 26, 1927 |